G. E. TRUAX.
ORE CAR.
APPLICATION FILED FEB. 20, 1912.
1,055,575.
Patented Mar. 11, 1913.
2 SHEETS—SHEET 1.
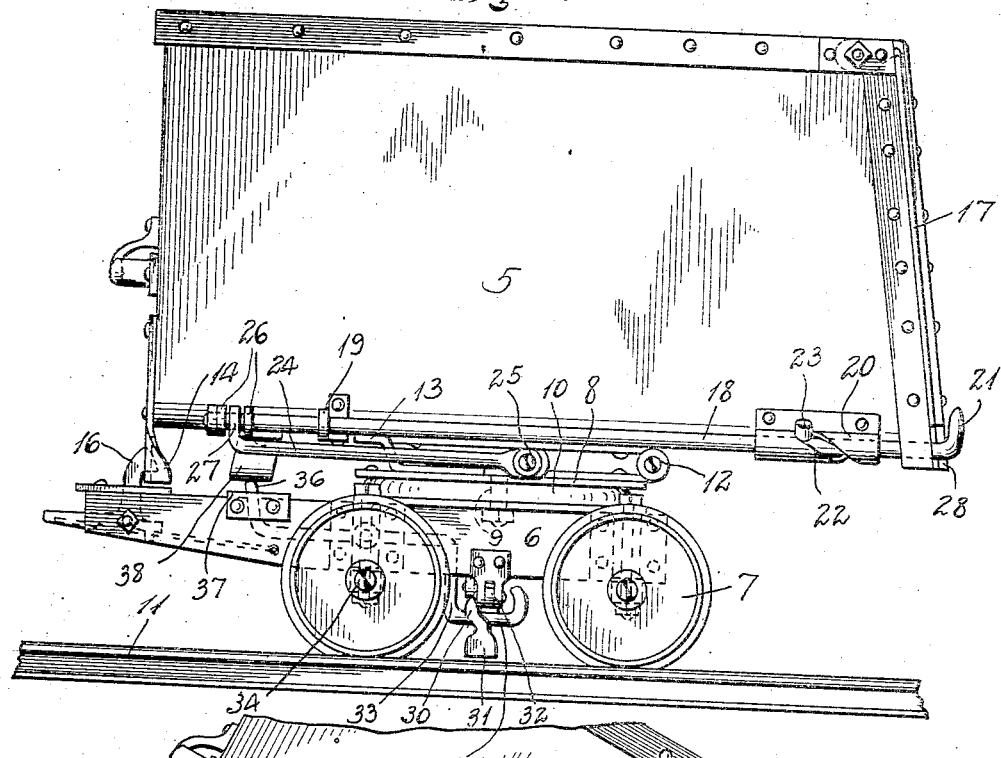
Witnesses
Inventor.
George E. Truax.

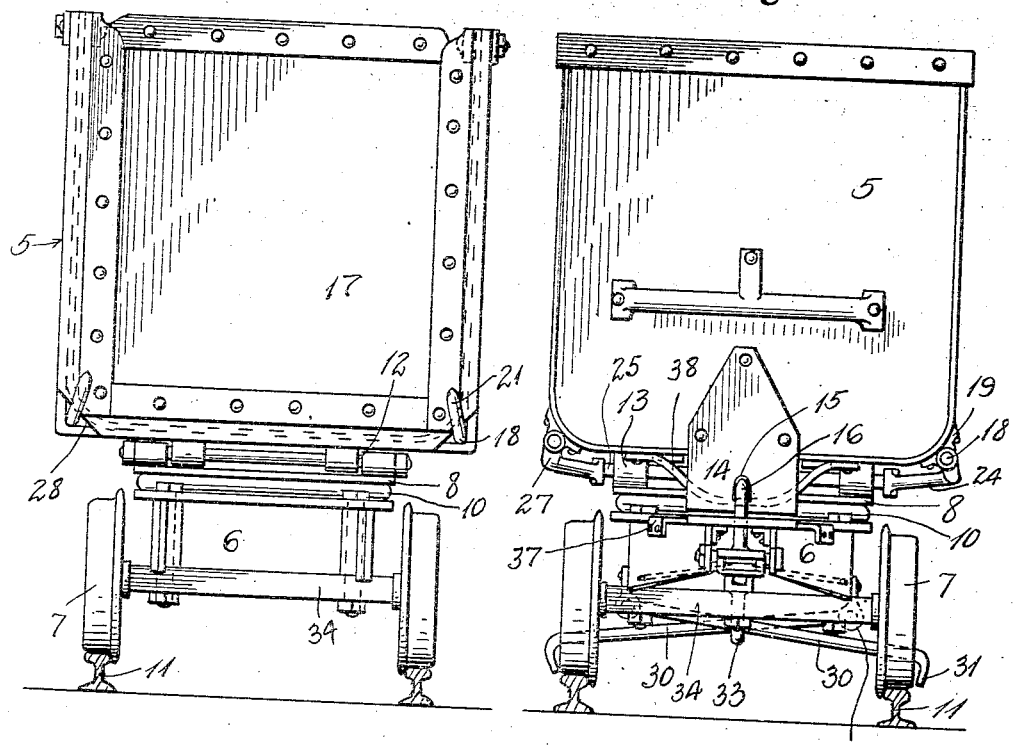
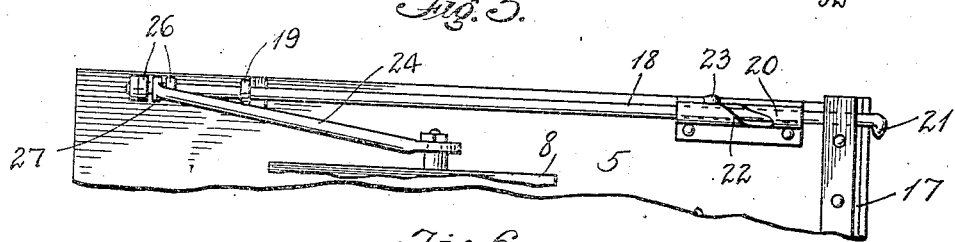
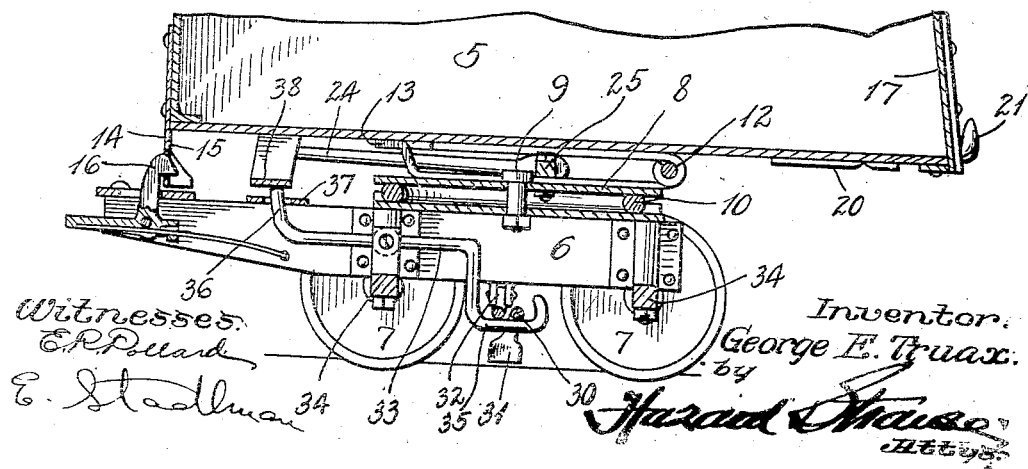

UNITED STATES PATENT OFFICE.

GEORGE E. TRUAX, OF INGLEWOOD, CALIFORNIA.

ORE-CAR.

1,055,575.  Specification of Letters Patent.  Patented Mar. 11, 1913.

Application filed February 20, 1912. Serial No. 678,938.

*To all whom it may concern:*

Be it known that I, GEORGE E. TRUAX, a citizen of the United States, residing at Inglewood, in the county of Los Angeles and State of California, have invented new and useful Improvements in Ore-Cars, of which the following is a specification.

This invention relates to improvements in ore cars and relates particularly to that class of cars which are suitable for dumping loads of ore or other materials by the tipping of the body portion thereof.

It is an object of the invention to provide an ore car, with mechanism for automatically locking and unlocking the door at the end thereof, past which the contents of the car passes in dumping the same in accordance with the tipping of the car, means also being provided for preventing the car from tipping upon its track.

It is a further object of the invention to provide a car of this character with a supporting base adapted to run upon a track, the base being provided with means for gripping a track when a car is to be dumped.

In the accompanying drawing forming a part of this specification, Figure 1 is a side elevation of an ore car constructed in accordance with the present invention. Fig. 2 is a similar view in side elevation but showing the body of the car in tipped or dumping position. Fig. 3 is an end elevation of a car looking at the discharge end thereof. Fig. 4 is an end elevation of the car looking at the opposite or closed end thereof. Fig. 5 is a detail view in bottom plan showing one of the door securing mechanisms located at the side of the car. Fig. 6 is a central vertical sectional view through the lower portion of the car and its track.

The details and features of the invention will now be more particularly described, reference being had to the said drawing in which 5 indicates a body portion of the ore car, 6 a truck for operating the same, and 7 the wheels upon which the truck is supported. The truck of the car may be of any usual or ordinary formation but is preferably of such a character as to pivotally support the ore car. For this purpose the said car is provided with a turn table or plate 8, pivotally secured to the top plate of the truck 6 by means of a king bolt 9. A circular bearing bar 10 is mounted upon the truck and movably supports the turn table 8 upon said truck, as it turns about the said king bolt. The wheels 7 are of the usual flanged type and run upon tracks 11.

The body portion of the car 5 is connected with the turn table 8 by hinges 12, the pintles of said hinges being arranged to extend across the turn table near one end thereof so that the body 5 may be readily tipped with respect to the edge of the truck. The opposite end of the turn table is provided with supports 13 for holding the said body portion when in horizontal position in coöperating with the hinges 12. The front end of the body is provided with a latch plate 14 having an aperture 15 therein, adapted to be engaged by the hooked end of a foot operated latch 16 of usual construction. The rear end of the car is provided with the usual hinged swinging door 17, the said door being pivotally secured to the body 5 at the upper edge thereof. The open or discharge end of the body is preferably inclined as clearly shown in Figs. 1 and 2 of the drawing, so that when the said body 5 is in horizontal position, the door will be closed and fitted tightly upon the edges of the body.

The means for locking the door in closed position and for automatically unlocking it when the car is dumped, together with the means for preventing the car from tipping upon the track form important features of the invention. The door locking means comprises reciprocating rods 18, extending nearly the full length of the body 5 and rotatably mounted in bearings 19 and 20 secured to the lower side edges of the body 5.

The ends of the rods adjacent to the doors 17 are turned laterally to form door locking detents 21. The ends of these detents are generally tapered so that they will turn easily upon the corner edges of the door in locking or unlocking the same. The detents are caused to swing out of the way of the door or into position for locking the same by the rotation of the rods 18 and such rotation is accomplished by forming a spiral slot 22 in each of the bearings 20 and by providing each rod 18 with a laterally projecting stud 23 adapted to move in the slots 22. When the rods 18 are moved longitudinally in unlocking the door they will be turned by the movement of the studs 23 in the slots 22, at the same time that the detents are moved outwardly from the end of the car as illustrated in Fig. 2, and the door will be released.

The rods 18 are reciprocated in accordance with the tipping of the body 5 by means of pitmen 24, which are pivoted to the truck 8 at their lower ends and are connected by a swivel connection with the ends of the rods 18 at their other ends. The said rods are usually journaled upon the ends of a cross shaft 25 mounted upon the said turn table 8. The swivel connection at their outer ends is afforded by means of collars 26 secured to said rods, between which laterally turned perforated end portions 27 formed upon said rods are mounted. By this construction when the body 5 is tipped the pitmen 24 will reciprocate the said rods 18, the said rods at the same time being rotated by the action of the studs 23. The lower corners of the door 17 are preferably beveled as at 28 to facilitate the action of the detents 21.

Since the tipping of the body especially when loaded with ore or heavy materials generally tends to tip the truck upon the track, the present invention contemplates a locking means for temporarily securing the truck to its track, coöperating with the car dumping mechanism. The said truck locking means comprises gripping bars 30 having rail engaging end portions 31. The said bars 30 are pivoted to the sides of the truck 6 at 32. Each rod 30 extends from its pivot point to the track upon the opposite side of the truck and when said rods are lowered their track engaging ends 31 will fall upon the heads of the rails so as to hook upon the same and prevent the tipping of the truck. Any lifting of the truck upon the track at such time only tends to cause the rods to more firmly hold upon the rails.

A lifting lever 33 is pivoted upon one of the axles 34 of the truck and is provided with a depressed hooked end 35, adapted to extend beneath the said bars 30. The other end of the lever 33 is turned upwardly at 36 passing through a guide aperture in a guide piece 37 secured to the truck so as to project a short distance above the same. The upturned end 36 is adapted to be depressed when the body 5 is in lowered position, by means of a bracket 38 secured to the underside of the said body.

The structure of the parts is such that when the body 5 is tipped as shown in Fig. 2, the inner end of the lever 33 upon which the bars 30 rest, will be depressed so that the said bars may grip the rails, the upturned end 36 of the lever 33 being free to rise. When the body 5 is lowered the bracket 38 will engage the end 36 of said lever and force it downwardly causing the hooked portion 35 thereof to lift the rods 30, out of engagement with the bracket, so that the car may be free to move thereon in the usual manner. It will be observed that the track gripping mechanism thus coöperates with the dumping mechanism of the car.

The operation of the mechanism will be clearly understood in connection with the above description and will require only a brief outline in addition thereof. The car body 5 in lowered position has its door 17 locked by means of the detents 21 carried by the rods 18. The car may then be loaded to its fullest capacity if desired and can be run upon its track, to any desired point for dumping. When the car is dumped the latch 16 is operated to release the closed end of the car and the car is tilted upon the hinges 12. As the car rises to its tipped position, the pitmen 24 will move the rods 18 forwardly, the said rods being turned at the same time by the studs 23 in the slots 22 so as to release the door and permit the contents of the car body to slide out of the same. The lifting of the car body also releases the lever 33 and causes the gripping rods 30 to engage and grip the rails of the track whereby the truck is absolutely prevented from tipping and leaving the rails. The lowering of the empty body 5 permits the door 17 to swing to its closed position again, so that the rods 18 as they are drawn inwardly will lock the same and the bracket 38 will operate the lever 33 to lift the track gripping means.

What I claim is:

1. A car having a dumping body portion and a swinging door at the discharge end thereof, and a slidably rotating locking member adapted to hold said door in locked position when the body is lowered and to unlock the door when the body is tipped.

2. An ore car mechanism, comprising a truck, a body portion pivotally mounted thereon and adapted to tip in discharging its load, a pair of slidably rotating locking members having door engaging detents, and means connecting the said slidably rotating members with the truck for operating the same.

3. An ore car, comprising a supporting truck, a car body hinged thereon, a gravity actuated door upon the discharge end of the body, locking rods journaled upon said body and having door engaging end portions, guide ways for rotating the said rods when they are moved longitudinally, and pitmen connecting the rods with the truck for reciprocating them when the truck is tipped upon its hinges.

4. An ore car comprising a supporting truck and a body portion pivotally hinged thereon, a turn table on said truck carrying the hinges of said body portion, a gravity door pivoted to said body, reciprocating latch rods mounted in bearings on the said body and having door locking end portions, detents carried by said latch rods to engage said door, studs carried by said latch rods, bearings for said rods having spiral slots therein adapted to engage said studs for rotating the said rods, pitmen pivoted upon said turn tables, and having laterally turned end portions engaging said latch rods, and collars carried by the said latch rods, and engaging the ends of said pitmen whereby a swivel connection between the parts is secured.

In witness that I claim the foregoing I have hereunto subscribed my name this 12th day of February, 1912.

GEO. E. TRUAX.

Witnesses:
EDMUND A. STRAUSE,
EARLE R. POLLARD.

Copies of this patent may be obtained for five cents each, by addressing the "Commissioner of Patents, Washington, D. C."